May 24, 1938.   B. ELLEFSEN   2,118,430
CENTRIFUGAL TORQUE CONVERTER
Filed Sept. 2, 1936
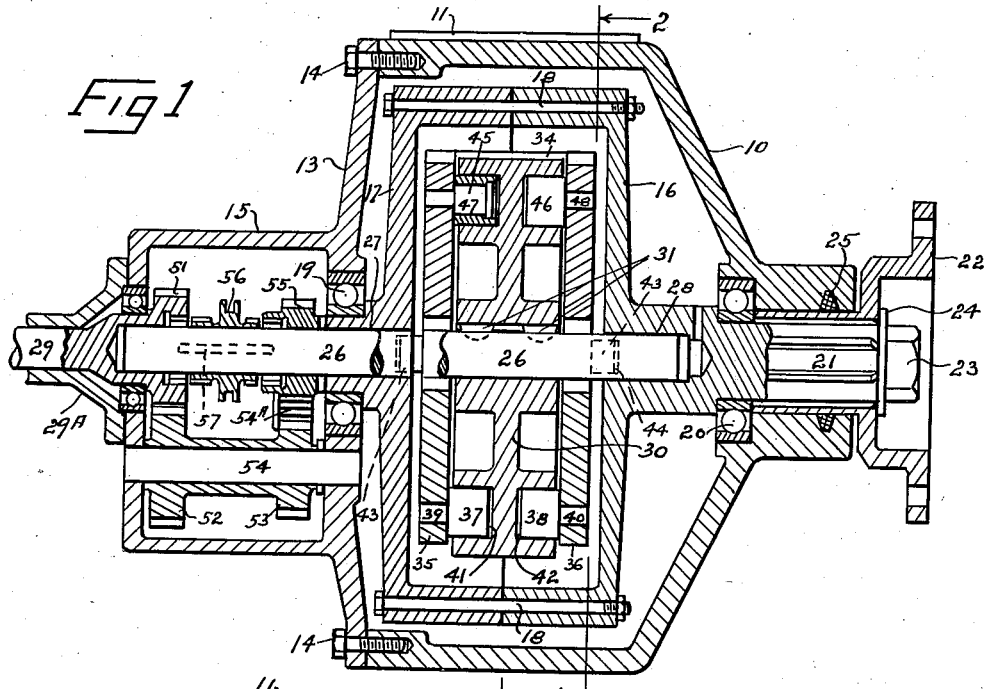
Fig 1
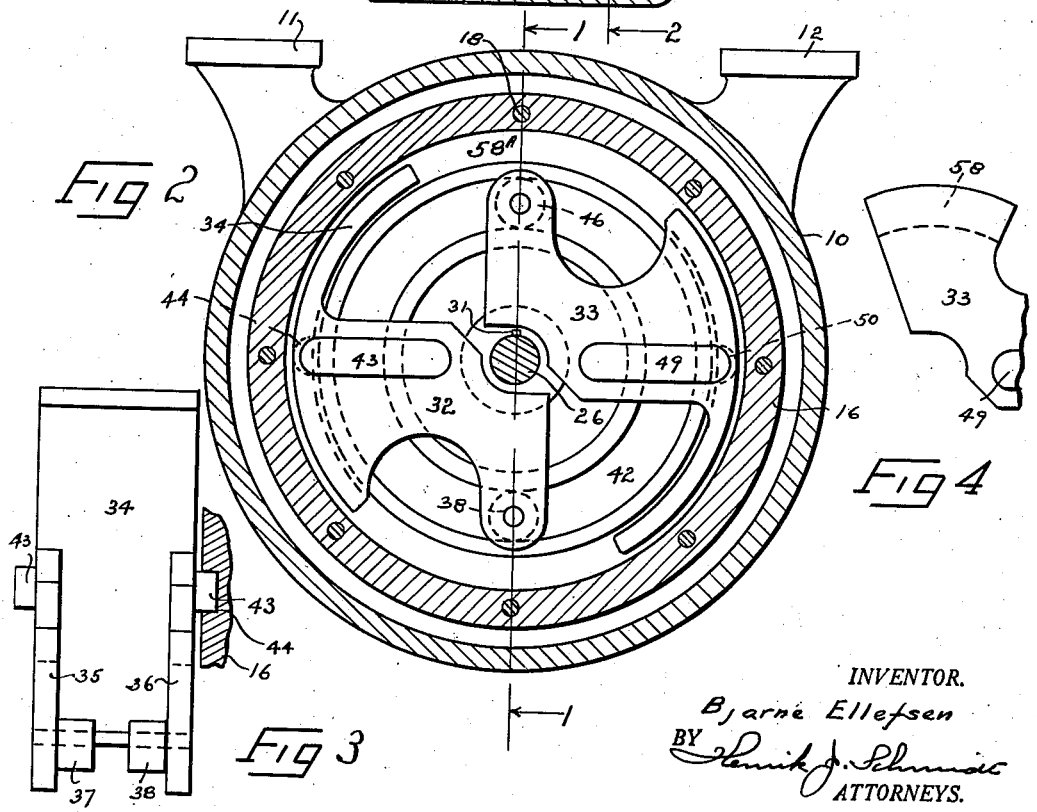
Fig 2
Fig 3
Fig 4
INVENTOR.
Bjarne Ellefsen
BY
ATTORNEYS.

Patented May 24, 1938

2,118,430

UNITED STATES PATENT OFFICE 2,118,430

CENTRIFUGAL TORQUE CONVERTER

Bjarne Ellefsen, Brooklyn, N. Y.

Application September 2, 1936, Serial No. 99,017

7 Claims. (Cl. 192—105)

The invention relates to centrifugal torque converters and, while it may find many other uses, it is particularly well adapted for use on automotive vehicles. The invention has for its main object to provide a device that will take the place not only of the present clutch used on automotive vehicles, but also of the fly-wheel and the various gears used for changes of speed.

A further object is to provide a device which will transmit all the various speeds within the capacity of the engine to which connected. A still further object is to provide a device which is positive in its operation, which has no parts easily broken or apt to get out of order, which can be installed and used with vehicles of all the various types, and which can be manufactured and installed at a cost far lower than that now expended for the parts which it displaces.

These and various other objects and advantages will be readily understood from the following description and from the accompanying drawing of preferred embodiments of the invention, in which, however, modifications may be made without departing from the scope of the appended claims. In the drawing Fig. 1 is a cross-sectional side elevation of the invention taken on line 1—1 in Fig. 2;

Fig. 2 is a cross-sectional front view taken on line 2—2 in Fig. 1;

Fig. 3 is a side view showing one of the centrifugal weights; and

Fig. 4 is a fragmental view of one of the centrifugal weights, shown slightly modified.

Referring now to the drawing, the device consists of a housing 10, which may be secured to an automobile chassis by means of supports 11 and 12 formed integrally with the housing. A cover 13 is bolted to the housing by means of cap screws 14 and this cover is provided with a gear casing 15.

A cylindrical drum, consisting of two parts 16 and 17 bolted together by means of bolts 18, rotates in the housing on ball bearings 19 and 20. The forward end 21 of this drum is keyed to a gland 22, which is rotated by the engine mounted on the vehicle upon which the device is employed. The drum is further secured to the gland by a nut 23 and a washer 24 and an oil packing 25 is provided. A relatively short jack shaft 26 is mounted in bearings 27 and 28, formed in the circular drum, and its rearward end rotates in the drive shaft 29 of the vehicle. This shaft is contained in a shaft housing 29A. A circular disc 30 is keyed to the jack shaft 26 by means of keys 31. Two centrifugal weights 32 and 33 are mounted partly in the disc 30 and partly in the parts 16 and 17 of the drum.

One of these weights, as for example 32, is shown in detail in Fig. 3. It consists of an arcuated body member, or weight, 34 having side members 35 and 36. These side members straddle the disc 30 and are of the shape plainly shown in Fig. 2. Rollers 37 and 38 are mounted on pins 39 and 40 on the inner sides of the side members. These rollers engage in grooves 41 and 42 formed in the disc 30. The rollers are slightly smaller in diameter than the width of the grooves so as to rotate freely in these.

The side plates 35 and 36 are also provided with outwardly-extending, elongated bosses 43 which fit slidingly in grooves 44 formed in the inner faces of the parts 16 and 17 of the cylindrical drum. The weight 33 is likewise provided with rollers 45 and 46, which rotate on pins 47 and 48, and with bosses 49, which fit in grooves 50 similarly cut in the parts 16 and 17.

A gear 51 is formed integrally with the drive shaft 28 and this gear meshes with a gear 52, formed in one piece with another gear 53, which is rotatingly mounted on a shaft 54 in the gear casing 15. The gear 53 meshes with an idler 54A which in turn meshes with a reverse gear 55 mounted on the shaft 26. A clutch 56 is slidingly mounted on a key 57 secured in the shaft 26, and this clutch is adapted to slide on the shaft to engage either in the gear 51 or 55 so as to drive the vehicle forward or rearward, as in the ordinary gear-shift device.

Fig. 4 shows a slight modification of the centrifugal weights. In this case the weights, instead of being provided with the rollers for engagement in the grooves, are provided with pressure shoes 58 which engage in the grooves in the same manner as do the rollers.

The device operates in the following manner. When the engine is rotated, the gland 22 is turned and consequently the circular drum will rotate at the same speed as the gland. As the drum is rotated the centrifugal weights, owing to the engagement of their outwardly extending bosses in the grooves in the inner faces of the drum, will be carried around with it, causing the rollers attached to the weights to turn around in the grooves 41 and 42. This will continue as long as the engine is "idling" or turning at low speed.

When the speed of the drum is increased centrifugal force will cause the weights 32 and 33 to be forced outwardly or apart from each other until the rollers are so forcibly engaged against the outer edges of the grooves 41 and 42 as to prevent any further rotation of the rollers. This will cause the disc 30 to rotate. As this disc is keyed to the shaft 26, this shaft will also rotate. It will be noted that the arcuated body members of the centrifugal weights are free to turn in the space 58A formed between the inner side of the drum and the disc 30. It will also be noted that the slots 44 and 50 are limited in length as shown in Fig. 2, so as to allow only a slight outward movement of the weights, thus at all times preventing the body members from engaging with the drum.

If now the clutch 56, in the gear casing 15, is shifted so as to engage in the gear 51, the drive shaft 29 will be turned and consequently the vehicle will move forward. If the clutch is shifted in the opposite direction so as to engage in the gear 55, the drive shaft will likewise be turned but in the opposite direction and thus the vehicle will move backward. The clutch may be operated by any suitable means, but these have not been shown as they are well-known in the art.

It is evident that the greater the speed of the drum, the greater will be the torque and thus the greater the power which can be transmitted to the drive shaft without any danger of slipping.

While I have described and illustrated the device as used on an automotive vehicle, it is evident that it may find many other uses. In like manner, it is evident that while I had to chose a certain specific construction to illustrate the device, a great many changes in the construction may be made without in any way departing from the invention.

Having described the invention and its objects, what I claim as new and wish to protect by Letters Patent is:

1. In a device of the class described; a rotatingly mounted drum; a shaft rotatingly mounted concentrically in said drum with one end extending therefrom; a disc, having concentric grooves, rigidly secured to said shaft; centrifugal weights mounted in said drum and in sliding relation thereto; contact members secured on said weights for engagement in said grooves; and means for connecting the drum to a source of rotary motion.

2. In a device of the class described; a rotatingly mounted drum; a shaft rotatingly mounted concentrically in said drum with one end extending therefrom; a disc, having concentric grooves, rigidly secured to said shaft; oppositely-disposed centrifugal weights mounted in said drum and in sliding relation thereto; rotatingly mounted contact members secured on said weights for engagement in said grooves; and means for connecting the drum to a source of rotary motion.

3. In a device of the class described; a rotatingly mounted drum; a shaft rotatingly mounted concentrically in said drum with one end extending therefrom; a disc, having concentric grooves on opposite sides, rigidly secured to said shaft; bifurcated centrifugal weights, adapted to straddle said disc, mounted in the drum and in sliding relation thereto; contact members secured on said weights in the bifurcations thereof for engagement in said grooves; and means for connecting the drum to a source of rotary motion.

4. In a device of the class described; a rotatingly mounted drum; a shaft rotatingly mounted concentrically in said drum with one end extending therefrom; a disc, having concentric grooves, rigidly secured to said shaft; centrifugal weights mounted in said drum and in sliding relation thereto; contact members secured on said weights for engagement in said grooves; means for connecting the drum to a source of rotary motion; and a housing for enclosing said drum.

5. In a device of the class described; a rotatingly mounted drum; a shaft rotatingly mounted concentrically in said drum with one end extending therefrom; a disc, having concentric grooves, rigidly secured to said shaft; centrifugal weights mounted in said drum and in sliding relation thereto; contact members secured on said weights for engagement in said grooves; a housing for enclosing said drum; and means for connecting the drum to a source of rotary motion.

6. In a device of the class described; a rotatingly mounted drum; a shaft rotatingly mounted concentrically in said drum with one end extending therefrom; a disc, having concentric grooves, rigidly secured to said shaft; centrifugal weights mounted in said drum and in sliding relation thereto; contact members secured on said weights for engagement in said grooves; a housing for enclosing said drum and having means for securing it to the chassis of an automotive vehicle; means for connecting the drum to the engine of such vehicle; and means for connecting the free end of the shaft to the drive shaft of the vehicle.

7. In a device of the class described; a rotatingly mounted drum; a shaft rotatingly mounted concentrically in said drum with one end extending therefrom; a disc, having concentric grooves, rigidly secured to said shaft; centrifugal weights mounted in said drum and in sliding relation thereto; contact members secured on said weights for engagement in said grooves; means for connecting the drum to the engine of an automotive vehicle.

BJARNE ELLEFSEN.